(12) United States Patent
Kuno et al.

(10) Patent No.: US 8,495,211 B2
(45) Date of Patent: Jul. 23, 2013

(54) NETWORK SERVICE SYSTEM AND MECHANISM FOR SEARCHING SERVICE REGISTRIES

(75) Inventors: Harumi Anne Kuno, Cupertino, CA (US); Michael J. Lemon, Palo Alto, CA (US); Alan H. Karp, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 2434 days.

(21) Appl. No.: 10/255,818

(22) Filed: Sep. 26, 2002

(65) Prior Publication Data

US 2004/0064554 A1    Apr. 1, 2004

(51) Int. Cl.
*G06F 15/173* (2006.01)
(52) U.S. Cl.
USPC .......................................................... 709/225
(58) Field of Classification Search
USPC .......................................... 709/225, 203, 201
See application file for complete search history.

(56) References Cited

U.S. PATENT DOCUMENTS

| | | | | |
|---|---|---|---|---|
| 5,920,856 A * | 7/1999 | Syeda-Mahmood | ............. | 707/3 |
| 6,064,980 A * | 5/2000 | Jacobi et al. | .................... | 705/26 |
| 6,185,558 B1 * | 2/2001 | Bowman et al. | .................. | 707/5 |
| 6,963,850 B1 * | 11/2005 | Bezos et al. | .................... | 705/26 |
| 7,099,946 B2 * | 8/2006 | Lennon et al. | ................ | 709/227 |
| 2002/0046157 A1 * | 4/2002 | Solomon | ......................... | 705/37 |
| 2002/0143819 A1 * | 10/2002 | Han et al. | ...................... | 707/513 |
| 2002/0173295 A1 * | 11/2002 | Nykanen et al. | .............. | 455/414 |
| 2003/0028451 A1 * | 2/2003 | Ananian | ......................... | 705/27 |
| 2003/0187841 A1 * | 10/2003 | Zhang et al. | ..................... | 707/4 |
| 2004/0176958 A1 * | 9/2004 | Salmenkaita et al. | ........ | 704/275 |

FOREIGN PATENT DOCUMENTS

WO    WO 01/86487    11/2001

OTHER PUBLICATIONS

Wagner, Harry et al., "Purpose and Scope of DCMI Registry," Dublin Core Metadata Initiative, Feb. 12, 2002.
Ehnebuske, David et al., "UDDI Version 2.0 Data Structure Reference—UDDI Open Draft Specification Jun. 8, 2001", Accenture et al., pp. 1-37.

* cited by examiner

*Primary Examiner* — John Macilwinen

(57) ABSTRACT

A network service system comprises a service registry adapted to interact with registry clients. The service registry includes a service registry interface operatively coupled to a service data registry and a metadata registry for processing unstructured queries from registry clients.

48 Claims, 7 Drawing Sheets

*Structured Query permits determination of security protocols and/or transport protocols supported by a given registered service Keywords: book price "used books"

| Service Name | Description | Business |
|---|---|---|
| Alibris pricing | Used book pricing | Alibris.com |
| Amazon book price | Price checker for books, new or used | Amazon.com |
| BarnesAndNobles | Price list for new and used books | BarnesAndNobles.com |
| | | |

NETWORK SERVICE SYSTEM AND MECHANISM FOR SEARCHING SERVICE REGISTRIES

FIELD OF THE INVENTION

The present invention relates generally to network service systems and more particularly to a mechanism for searching service registries.

BACKGROUND OF THE INVENTION

The growing popularity of XML (Extensible Markup Language) paves the way for increased usage of service registries. A registry in general pertains to a central location where information can be registered, stored and looked up. A service registry is essentially a database of information about services. The information may be as simple as mappings from high level abstract names to hard-wired network addresses, or as complex as invocation, network management policy and security data. Typically, service registries contain fine-grained information about enterprise-specific services without spanning organizational boundaries. For web services, however, service registries promote service discovery and integration across enterprises. Web service registries are unique in that in addition to searching data contained in the actual database entries (as a traditional database is searched), one can also exploit the fact that these databases contain URLs (Uniform Resource Locators) that could be taken into account when identifying and ranking potential matches.

In this regard, the Universal Description Discovery and Integration (UDDI) project offers a platform-independent, open framework for describing services, discovering businesses, and integrating business services using the Internet. UDDI is designed to support the discovery of external (outside a company) service information while other mechanisms, such as JNDI™ (Java Naming and Directory Interface), Microsoft Active Directory™, etc., may be used to discover internal service information, i.e. information about services within a company. UDDI registries publish and discover information about web services. Web services may be broadly described as applications capable of executing transactions via the Internet, Web service generally refers to specific business functionality exposed by a company to provide a way for another company or software program to use the service.

A UDDI registry (also called a UDDI repository) provides a standard mechanism to classify, catalog, and manage information about web services so that the services can be discovered and used. UDDI registries are intended to enable businesses and providers to perform tasks such as:

finding web service implementations that are based on a common abstract interface definition;
finding web service providers that are classified according to a known classification schema or identifier system;
determining the security and transport protocols supported by a given web service;
issuing a search request for services based on a general keyword;
caching technical information about a web service and then updating the cached information at runtime, etc.

The two main components of UDDI are the UDDI information model and the UDDI API set. Each UDDI registry consists of one or more UDDI nodes that collectively manage a particular set of UDDI data. Each UDDI node comprises a set of web services supporting standard set of services and APIs. The UDDI specification defines six node API sets (UDDI Inquiry, UDDI Publication, UDDI Security, UDDI Custody Transfer, UDDI Subscription, and UDDI Replication), as well as two client API (application program interface) sets (UDDI Subscription Listener and UDDI Value Set). Each set of web services supports at least one of the node API sets.

The UDDI information model is composed of instances of persistent data structures called entities. There are six fundamental types of UDDI entities:

businessEntity: Describes a business or other organization that typically provides web services (e.g., contact information).
businessService: Describes a collection of related web services offered by an organization described by a businessEntity.
bindingTemplate: Describes the technical information necessary to use a particular web service.
tModel: Describes a "technical model" representing a reusable concept, such as a web service type, a protocol used by web services, or a category system.
publisherAssertion: Describes, in the view of one businessEntity, the relationship that the businessEntity has with another businessEntity.
subscription: Describes a standing request to keep track of changes to the entities described by the subscription.

A UDDI business registry typically offers both a web-based user interface and a programmatic interface. Any kind of service can be registered in the UDDI business registry, such as electronic and/or non-electronic services, with the primary intent behind the UDDI project being to provide a global registry (or registry) for services. The UDDI registry thus has database-like properties (because it has a data schema and can be searched like a database), as well as web-like properties (because it can refer to URLs which may contain links to and be linked to by other URLs).

Existing UDDI search mechanisms use unwieldy and constrained query techniques that require manual traversal of internal registry data structures. Much work has been done in the area of web search engines, XML database queries, collaborative filtering and data mining. However, UDDI registries do not currently implement systems that leverage known techniques from the areas of data mining and collaborative filtering to improve the ranking of search results.

Data mining deals generally with analysis of data to identify patterns and establish relationships. Typical data mining techniques include identifying associations, sequence or path analysis, classification (looking for new patterns), clustering (identifying and documenting new groups of facts), etc. More information on data mining may be found, for example, in J. Han and M. Kamber's "Data Mining: Concepts and Techniques", Morgan Kauffmann Publishers, 2001.

Collaborative filtering may be defined as a set of software tools that leverage user preferences, patterns, and purchasing behavior to customize organization and navigation systems. Known collaborative filtering programs include, for example, Marcomedia's LikeMinds™, beFree's BSELECT T, etc. Essentially, collaborative filtering automates the recommendation of information to people based on the opinions of other people. More information on collaborative filtering may be found, for example, in a publication by D. Goldberg, D Nichols, B. M. Oki, and D. Terry entitled "Using Collaborative Filtering to Weave an Information Tapestry", CACM 35(12), 61-70, December 1992. Collaborative filtering, however, is not being used to search service registries. For example, Http://www.soapclient.com/uddisearch.htrnl and http://test.uddi.microsoft.com/search.aspx each provide UDDI search engines which require users to specify which UDDI data structures are being searched. These two UDDI search engines do not search URLs referenced from within the data entries or support collaborative filtering.

SUMMARY OF THE INVENTION

The present invention is directed to a network service system comprising at least one service registry adapted to interact with at least one registry client. The service registry includes at least one service registry interface operatively coupled to at least one service data registry and at least one metadata registry for processing unstructured queries from registry clients.

The present invention is also directed to a mechanism for searching service registries comprising at least one service registry interface operatively coupled to at least one service data registry and at least one metadata registry for processing unstructured queries from at least one registry client.

These and other aspects of the present invention will become apparent from a review of the accompanying drawings and the following detailed description of the preferred embodiments of the present invention.

BRIEF DESCRIPTION OF THE DRAWINGS

The invention is generally shown by way of example in the accompanying drawings in which.

DETAILED DESCRIPTION OF THE PREFERRED EMBODIMENTS

Hereinafter, some preferred embodiments of the present invention will be described in detail with reference to the related drawings of FIGS. 1-7. Additional embodiments, features and/or advantages of the invention will become apparent from the ensuing description or may be learned by the practice of the invention.

The drawings are not to scale with like numerals referring to like features throughout both the drawings and the description.

The following description includes the best mode presently contemplated for carrying out the invention. This description is not to be taken in a limiting sense, but is made merely for the purpose of describing the general principles of the invention.

Figure 1:
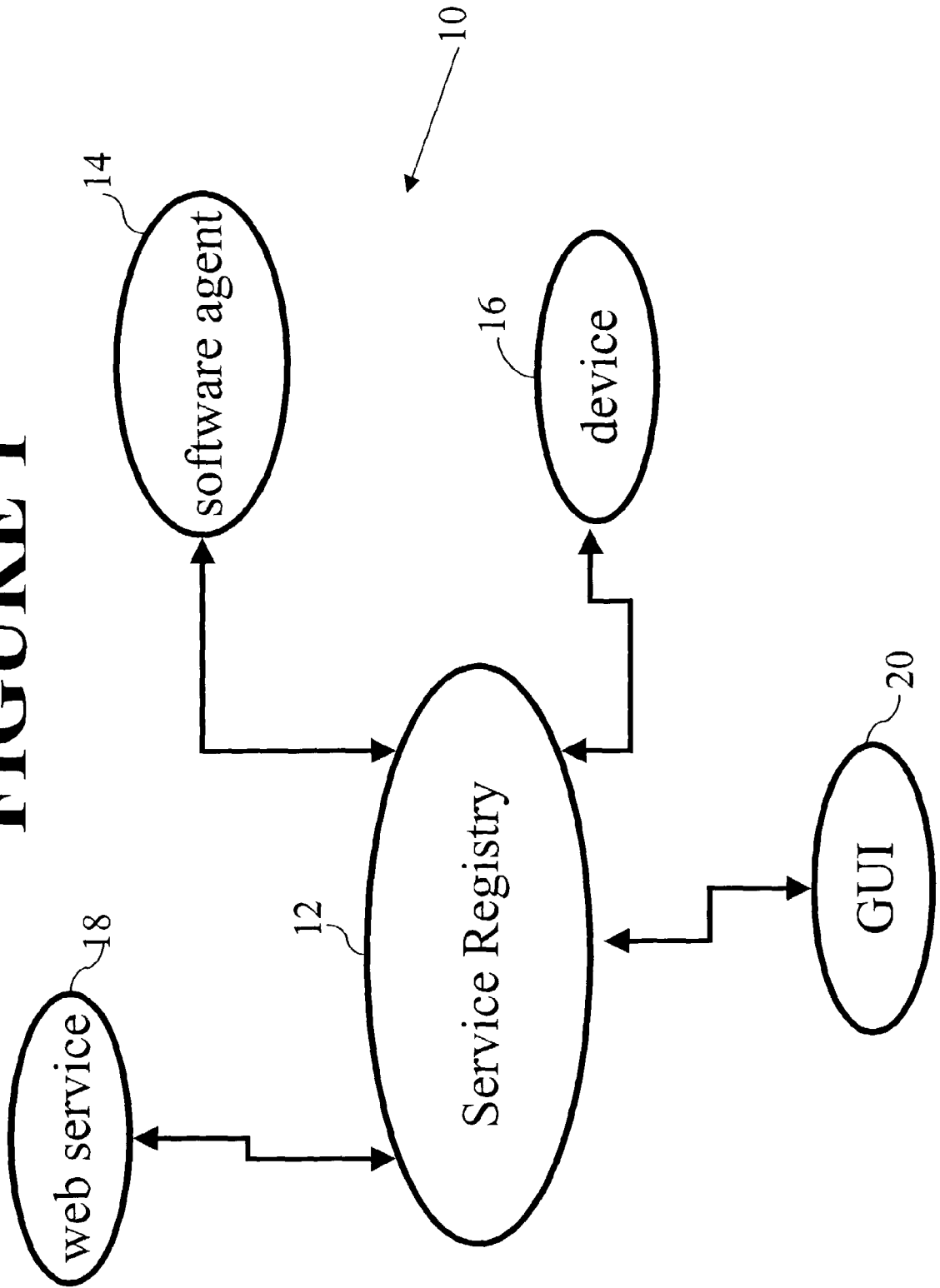
FIG. 1 is a schematic representation of a typical network service system.

Turning to FIG. 1, a network service system, generally referred to by reference numeral 10, typically comprises a service registry 12 adapted to interact with a variety of clients, such as, for example, a software agent 14. Software agents run autonomously gathering information or performing some other service without the user's immediate presence on some pre-set schedule. One example of a software agent is Infogate™, which alerts the user automatically about news on specified topics of interest. A number of similar agents compare shopping prices. Other types of agents include specific web site watchers which inform the user when the site has been updated or look for other events. There are also analyst agents that not only gather but organize and interpret information for the user. More information on software agents may be found in an article entitled "Software Agents", by N. Jennings and M. Wooldridge, IEEE Review, January 1994, pages 17-20. Software agent 14 is preferably programmed to interact with service registry 12 for the purpose of discovering or advertising services on service registry 12 (FIG. 1).

Service registry 12 can also interact with a device 16, a web service 18, or a user interface such as, for example, a graphical user interface (GUI) 20. Device 16 may be, for example, a PALM™-based PDA (personal digital assistant) programmed to search and gather information on web services that are of interest to the PDA user. Web service 18 and GUI 20 are preferably programmed to query service registry 12 for services which may be of interest. One such GUI may be found, for example, at http://www.soapclient.com/UDDISearch.html. In general, all four types of clients (software agent, device, web service, and GUI) should be capable of interacting with service registry 12 to discover and/or advertise services.

In general, service registry 12 may be a peer-to-peer (P2P) registry, e.g. of the Gnutella™ or Napster™ type, or it may be a UDDI registry. The UDDI registry is a logically centralized, physically distributed service with multiple root nodes (UDDI registry servers) that replicate data with each other on a regular basis. For example, IBM's UDDI registry server may be found at https://uddi.ibm.com/ubr/registry.html (requires a password). The UDDI specification consists of an XML schema for SOAP (Simple Object Access Protocol) messages for registering and discovering web services and a description of the UDDI API.

Once a business is registered with a UDDI root node, the data is automatically shared with the rest of the UDDI root nodes so as to provide a "register-once-publish-everywhere" access to web service information for a UDDI client. One drawback is that, although UDDI features a SOAP message-based interface for programmatic access and publishes schemas describing its data structures, UDDI is optimized for interaction with service developers, not software agents. Another drawback is that the UDDI registry is not a general-purpose search engine. Search engines use free-text queries to search unstructured data. The UDDI registry contains very structured data. A query against the UDDI registry reflects the structure of the UDDI data models and can only retrieve data that is stored within the registry.

Figure 2:
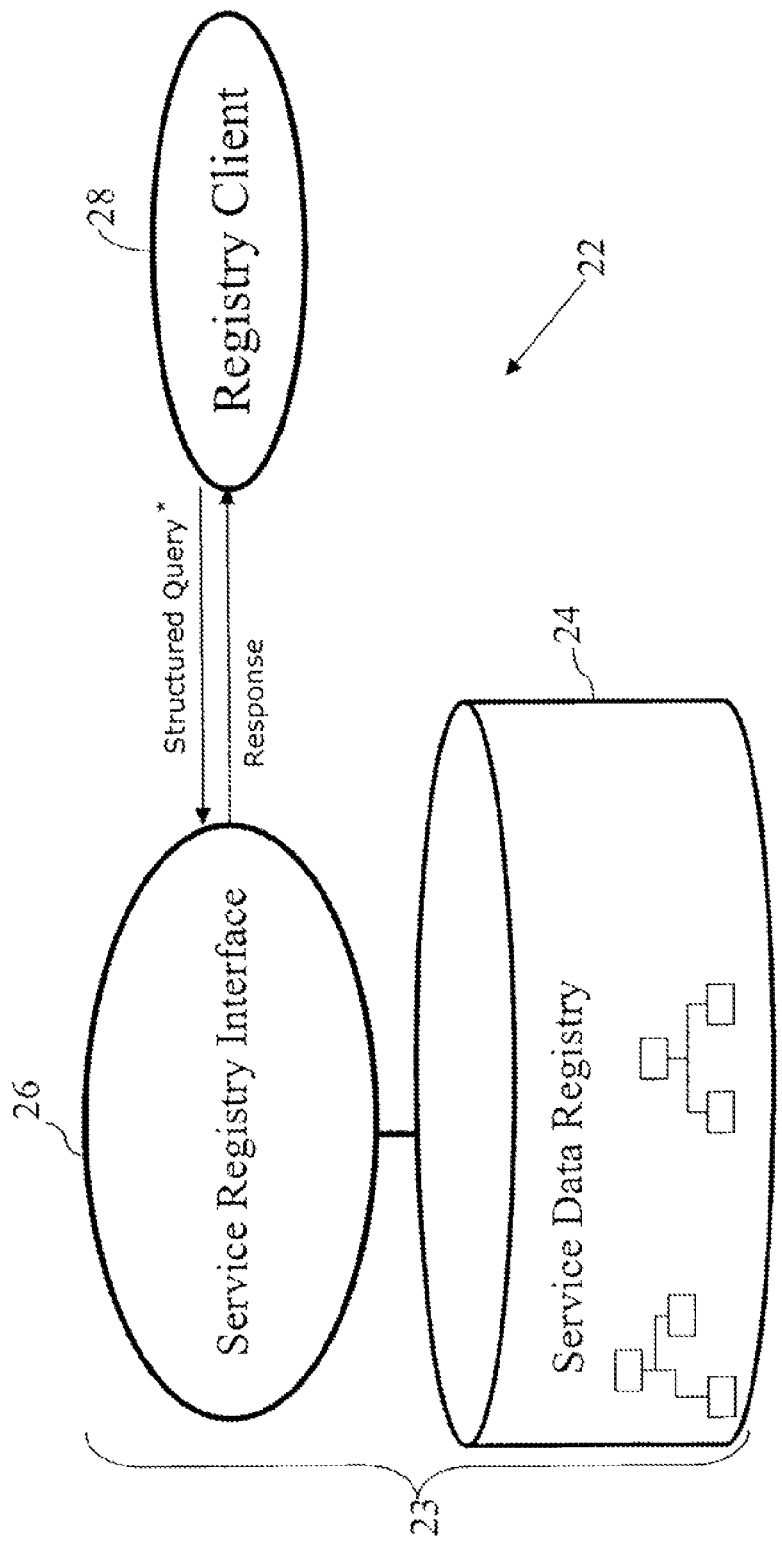
FIG. 2 is a schematic representation of a conventional mechanism for searching service registries.

FIG. 2 illustrates schematically a conventional mechanism for searching service registries. Specifically, a network service system 22 comprises a service registry 23 adapted to interact with a registry client 28. Service registry 23 may be a UDDI service registry including a service data registry 24 coupled to a service registry interface 26 programmed to interact with registry client 28 via the SOAP protocol. Registry client 28 may be any one of the four types of clients mentioned hereinabove in reference to FIG. 1, i.e. software agent, device, web service, or user interface such as, for example, a GUI.

UDDI service data registry 24 stores data in registry-specific schemas, i.e. it is a database containing specifically structured records that provide information on various web services advertised by the registered companies. UDDI service registry interface 26 is programmed to permit entry only at certain levels of the data schema and, therefore, can handle only structured queries (i.e., queries that reflect the structure of the registry data schemas) from registry client 28. Registry client 28 cannot, in general, conduct generic (unstructured) Google™-like queries of UDDI service registry 23. The limitations inherent in using structured queries to access UDDI service registry 23 are best illustrated by the following UDDI query/response example:

```
                UddiQuery2.xml is a structured query that asks for
the business details of a certain business (identified by a UDDI key):
<?xml version='1.0' encoding='UTF-8'?>
        <Envelope xmlns='http://schemas xmlsoap.org/soap/envelope/'>
        <Body>
                <get_businessDetail generic="1.0" maxRows="500"
xmlns="urn:uddi-org.api">
                        <businessKey>94DA018F-58C2-4AB5-A8D6-
6D46B75FF34E</businessKey>
                        <businessKey>92F47600-3AAF-11D5-80DC-
002035229C64</businessKey>
                </get_businessDetail>
        </Body>
        </Envelope>
                UddiReply2.xml is a corresponding response from a
Microsoft UDDI server:
<?xml version="1.0" encoding="UTF-8" ?>
        <Envelope xmlns="http://schemas.xmlsoap.org/soap/envelope/">
        <Body>
        <businessDetail generic="1.0" xmlns="urn.uddi-org:api"
operator="www.ibm.com/services/uddi" truncated="false">
        <businessEntity authorizedName="RealNames UDDI Publisher"
operator="Microsoft Corporation" businessKey="94DA018F-58C2-
4AB5-A8D6-6D46B75FF34E">
                <discoveryURLs>
                        <discoveryURL
useType="businessEntity">http://uddi.microsoft.com/discover
y?businessKey=94DA018F-58C2-4AB5-A8D6-
6D46B75FF34E</discoveryURL>
                </discoveryURLs>
                <name>B & G Electronics, Inc.</name>
                <description xml:lang="en">This is a UDDI Business Registry
entry for "B & G Electronics, Inc.".</description>
                <contacts>
                <contact>
                        <description xml:lang="en">Main contact
information</description>
                        <personName>Cory Archer</personName>
                        <phone useType="Main">216.521.2855</phone>
                        <email useType="Main">cjarcher@bge net</email>
                <address useType="Main">
                        <addressLine>15729 Madison Avenue</addressLine>
                        <addressLine>Lakewood, OH 44107</addressLine>
                        <addressLine>us</addressLine>
                </address>
                </contact>
                <contact>
                        <description xml:lang="en">Technical contact
information</description>
                        <personName>Cory Archer</personName>
                        <phone useType="Technical">216.521 2855</phone>
                        <email useType="Technical">cjarcher@bge net</email>
                <address useType="Technical">
                        <addressLine>15729 Madison Avenue</addressLine>
                        <addressLine>Lakewood, OH 44107</addressLine>
                        <addressLine>us</addressLine>
                </address>
                </contact>
                <contact>
                        <description xml:lang="en">Billing contact
information</description>
                        <personName>Cory Archer</personName>
                        <phone useType="Billing">216.228.7335</phone>
                        <email useType="Billing">cjarcher@bge.net</email>
                <address useType="Billing">
                        <addressLine>1290 Edwards Avenue</addressLine>
                        <addressLine>Lakewood, OH 44107</addressLine>
                        <addressLine>us</addressLine>
                </address>
                </contact>
                </contacts>
        <identifierBag>
                <keyedReference tModelKey="UUID:3BB93DE3-CF9A-
4F4D-B553-6537B012D0E0" keyName="keyword" keyValue="adam
kadmon US" />
                <keyedReference tModelKey="UUID:3BB93DE3-CF9A-
4F4D-B553-6537B012D0E0" keyName="keyword" keyValue="adam
kadmon US" />
                <keyedReference tModelKey="UUID:3BB93DE3-CF9A-
4F4D-B553-6537B012D0E0" keyName="keyword" keyValue="bge
US" />
                <keyedReference tModelKey="UUID:3BB93DE3-CF9A-
4F4D-B553-6537B012D0E0" keyName="keyword"
keyValue="giftshoppe US" />
                <keyedReference tModelKey="UUID:3BB93DE3-CF9A-
4F4D-B553-6537B012D0E0" keyName="keyword" keyValue="guitar
grimoire US" />
                <keyedReference tModelKey="UUID:3BB93DE3-CF9A-
4F4D-B553-6537B012D0E0" keyName="keyword"
keyValue="guitargrimoire US" />
                <keyedReference tModelKey="UUID:3BB93DE3-CF9A-
4F4D-B553-6537B012D0E0" keyName="keyword"
keyValue="reclamite US" />
        </identifierBag>
        </businessEntity>
        <businessEntity authorizedName="010000325W"
operator="www.ibm.com/services/uddi" businessKey="92F47600-
3AAF-11D5-80DC-002035229C64">
                <discoveryURLs>
                        <discoveryURL useType="businessEntity">http://www-
3.ibm.com/services/uddi/uddiget?businessKey=92F47600-3AAF-11D5-
80DC-002035229C64</discoveryURL>
                </discoveryURLs>
                <name>B&H PHOTO VIDEO PRO AUDIO INC</name>
                <description xml:lang="en">B&HThe Professional's SourceB&H is
among the leading worldwide on-line, mail order and retail supplier of
the complete gamut of imaging products for professionals and consumers
alike We serve the video, photographic, digital- imaging, audio-
visual,</description>
                <contacts>
                <contact useType="Main">
                        <personName>DANIEL WAXEL</personName>
                        <phone useType="Main">2122397500</phone>
                        <email useType="Main">DW@BHPHOTO.COM</email>
                <address useType="Main" sortCode="10001">
                        <addressLine>420 9 AVE</addressLine>
                        <addressLine/>
                        <addressLine>NYC</addressLine>
                        <addressLine>NYC</addressLine>
                        <addressLine>USA</addressLine>
                </address>
                </contact>
                </contacts>
        <identifierBag>
                <keyedReference tModelKey="UUID:C1CF85F6-8567-4B93-
8560-69FB77D0FB18" keyName="D-U-N-S" keyValue="116012659"/>
        </identifierBag>
        <categoryBag>
                <keyedReference tModelKey="UUID:C0B9FE13-179F-413D-
8A5B-5004DB8E5BB2" keyName="NAICS" keyValue="334613" />
                <keyedReference tModelKey="UUID:C0B9FE13-179F-413D-
8A5B-5004DB8E5BB2" keyName="NAICS" keyValue="33422" />
                <keyedReference tModelKey="UUID:C0B9FE13-179F-413D-
8A5B-5004DB8E5BB2" keyName="NAICS" keyValue="334612" />
                <keyedReference tModelKey="UUID:C0B9FE13-179F-413D-
8A5B-5004DB8E5BB2" keyName="NAICS" keyValue="42142" />
                <keyedReference tModelKey="UUID:C0B9FE13-179F-413D-
8A5B-5004DB8E5BB2" keyName="NAICS" keyValue="33792" />
                <keyedReference tModelKey="UUID:C0B9FE13-179F-413D-
8A5B-5004DB8E5BB2" keyName="NAICS" keyValue="334412" />
                <keyedReference tModelKey="UUID:C0B9FE13-179F-413D-
8A5B-5004DB8E5BB2" keyName="NAICS" keyValue="33431" />
                <keyedReference tModelKey="UUID:C0B9FE13-179F-413D-
8A5B-5004DB8E5BB2" keyName="NAICS" keyValue="33421" />
                <keyedReference tModelKey="UUID:C0B9FE13-179F-413D-
8A5B-5004DB8E5BB2" keyName="NAICS" keyValue="325992" />
```

-continued

```
        <keyedReference tModelKey="UUID:C0B9FE13-179F-413D-
8A5B-5004DB8E5BB2" keyName="NAICS" keyValue="44313" />
        <keyedReference tModelKey="UUID:C0B9FE13-179F-413D-
8A5B-5004DB8E5BB2" keyName="NAICS" keyValue="51219" />
        <keyedReference tModelKey="UUID:C0B9FE13-179F-413D-
8A5B-5004DB8E5BB2" keyName="NAICS" keyValue="512199" />
        <keyedReference tModelKey="UUID:C0B9FE13-179F-413D-
8A5B-5004DB8E5BB2" keyName="NAICS" keyValue="81292" />
        <keyedReference tModelKey="UUID:C0B9FE13-179F-413D-
8A5B-5004DB8E5BB2" keyName="NAICS" keyValue="4214" />
        <keyedReference tModelKey="UUID:C0B9FE13-179F-413D-
8A5B-5004DB8E5BB2" keyName="NAICS" keyValue="42141" />
      </categoryBag>
    </businessEntity>
  </businessDetail>
 </Body>
</Envelope>
```

Figure 3:
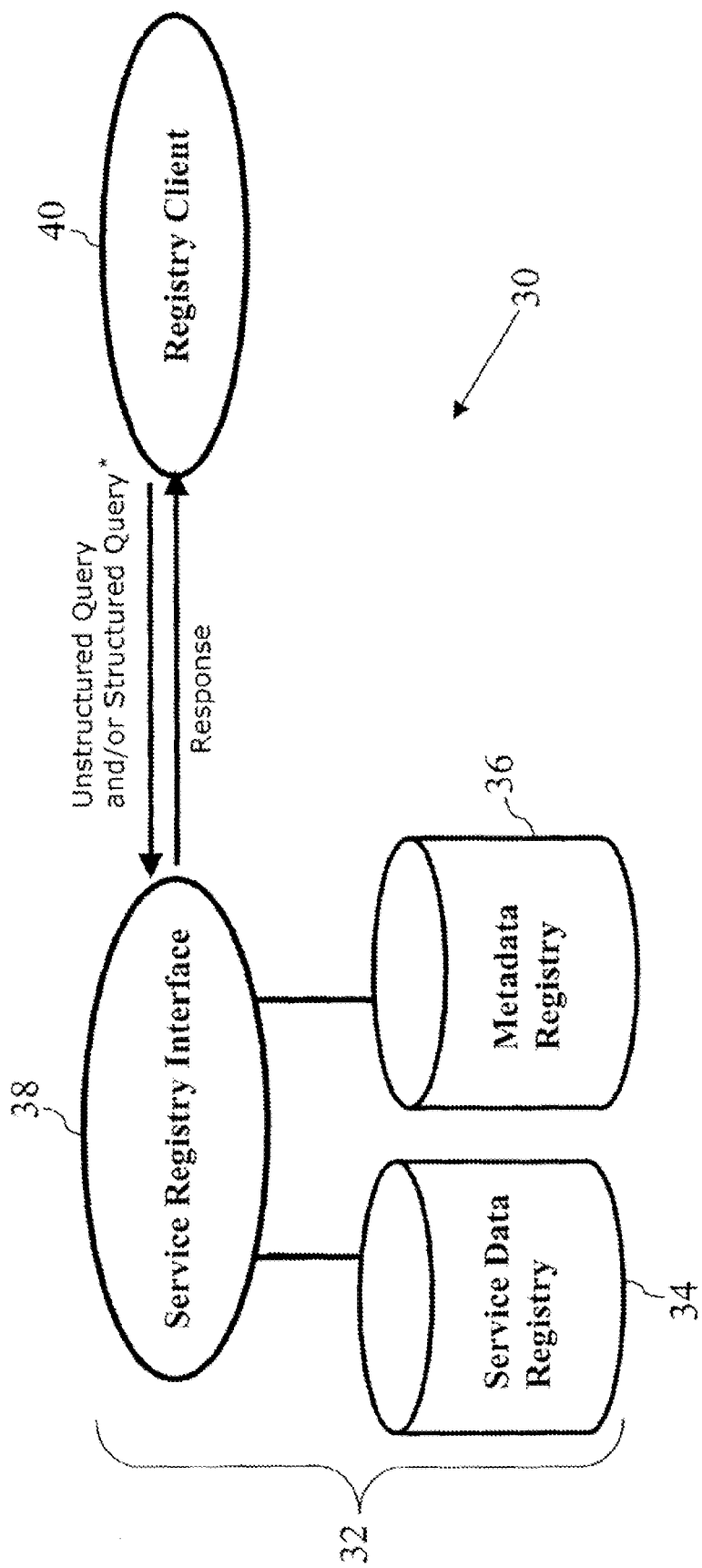
FIG. 3 is a schematic representation of a mechanism for searching service registries in accordance with one embodiment of the present invention.

FIG. 3 schematically depicts a mechanism for searching service registries in accordance with a preferred embodiment of the present invention. Specifically, a network service system 30 comprises a service registry 32 adapted to interact with a registry client 40. Service registry 32 is preferably a UDDI service registry modified to include a metadata registry 36 in addition to a service data registry 34 with both metadata and service data registries being coupled to a service registry interface 38 programmed to interact with registry client 40 via the SOAP protocol. Registry client 40 may be any one of the four types of clients mentioned hereinabove in reference to FIG. 1, i.e. software agent, device, web service, or user interface such as, for example, a GUI.

A person skilled in the art would readily recognize that including a metadata registry as part of a UDDI service registry is not part of the formal UDDI requirements and must, therefore, be generated. Metadata registry 36 may be generated (and subsequently updated) in a number of ways, as described hereinafter in reference to FIG. 5.

UDDI service data registry 34 stores data in registry-specific schemas, while UDDI metadata registry 36 stores metadata. Metadata is generally information which describes or defines data. Metadata is descriptive information about an object or resource whether it be electronic or non-electronic. While metadata as a concept is relatively new, the underlying concepts behind metadata have been in use for as long as collections of information have been organized. Library card catalogs represent a well-established type of metadata that has served as collection management and resource discovery tools for decades.

Specifically, UDDI metadata registry 36 stores information that is in addition to the registry-specific data stored by UDDI service data registry 34. For example, metadata registry 36 may contain indices on web service descriptions stored in service data registry 34, or statistics about the web pages that are referenced by the entries in service data registry 34, as well as statistics on data usage. Metadata registry 36 may also include information on registration data supplied by a UDDI registrant, e.g., keywords that characterize web pages referenced in the registration data.

A person skilled in the art would also readily recognize that the information stored in metadata registry 36 would now enable UDDI service registry interface 38 to process not only structured queries, but also unstructured, free-text (Google™-like) queries (e.g., keywords, description of a company, service, product, etc.) from registry client 40, as generally illustrated in FIG. 3. For example, registry client 40 may send an unstructured query to UDDI service registry interface 38 containing the terms "printers" and "SOAP", and the response from UDDI service registry interface 38 may include reference to all printing companies that provide SOAP interfaces.

Using unstructured queries to access UDDI service registry 32 helps enhance the quality of results being returned to registry client 40. The advantages (to registry client 40) of employing unstructured queries to search UDDI service registry 32 (made possible by the addition of metadata registry 36) is best illustrated graphically in reference to FIG. 6.

Figure 6:
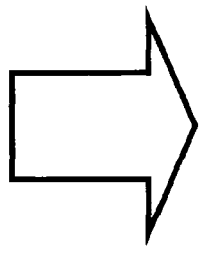
FIG. 6 is a graphic example of a system response to an unstructured query in accordance with one embodiment of the present invention.

Specifically, FIG. 6 depicts one example of an unstructured query (containing keywords: "book", "price" and "used books") being sent from registry client 40 to UDDI service registry interface 38 which outputs a response including several URLs that may provide links to "drill down queries" for more details about a related service or business. The XML version (formatted for readability) of the example of FIG. 6 is presented hereinbelow as follows:

```
        KeySearch.xmlquery:
<?xml version="1.0" encoding="UTF-8"?>
<SOAP-ENV:Envelope xmlns:SOAP-ENV="http://schemas
xmlsoap.org/soap/envelope/"
xmlns:SOAP-ENC="http://schemas xmlsoap org/soap/encoding/"
xmlns:xsi="http://www.w3.org/2001/XMLSchema-instance"
xmlns:xsd="http://www.w3.org/2001/XMLSchema"
SOAP-ENV encodingStyle="http://schemas.xmlsoap
org/soap/encoding/">
        <SOAP-ENV:Body>
            <namesp1 KeywordSearchRequest
                xmlns:namesp1="http://foo/SoapService">
                <KeywordSearchRequest xsi:type="m
KeywordRequest">
                    <keyword >book</keyword>
                    <keyword >price</keyword>
                    <keyword >used books</keyword>
                    1
                </KeywordSearchRequest>
            </namesp1.KeywordSearchRequest>
        </SOAP-ENV:Body>
</SOAP-ENV:Envelope>
        KeySearchResult.xmlresponse:
<?xml version="1.0" encoding="UTF-8"?>
<SOAP-ENV Envelope xmlns:SOAP-ENV="http://schemas xmlsoap
org/soap/envelope/"
xmlns:SOAP-ENC="http://schemas xmlsoap org/soap/encoding/"
xmlns:xsi="http://www w3 org/2001/XMLSchema-instance"
xmlns:xsd="http://www w3 org/2001/XMLSchema"
SOAP-ENV encodingStyle="http://schemas.xmlsoap
org/soap/encoding/">
        <SOAP-ENV:Body>
            <namesp1:KeywordSearchResult
                xmlns:namesp1="http://foo/SoapService">
                <KeywordSearchResult
xsi:type="m.KeywordResult">
                    <result>
                        <serviceName>alibris
pricing</serviceName>
<serviceDetailURL>https://uddi.hp.com/ubr/findservice?action=detail&
servicekey=F2D1B760-8BB2-12E5-AD9C-
002033459C62</serviceDetailURL>
                        <description>used book
pricing</description>
                        <business>Alibris</business>
<businessDetailURL>https://uddi.hp.com/ubr/findbusiness?action=
details&businesskey=AFB368F0-3AAF-11D2-80DC-
005035329C64</businessDetailURL>
                    </result>
                    <result>
                        <serviceName>amazon book
price</serviceName>
<serviceDetailURL>https://uddi.hp.com/ubr/findservice?action=details&
servicekey=B2D1B960-8AB2-12A2-AF9C-
002052459C62</serviceDetailURL>
                        <description>Price checker for
books, both new and used</description>
```

-continued

```
                <business>Amazon</business>
<businessDetailURL>https://uddi.hp.com/ubr/findbusiness?action=
details&businesskey=AAA364F0-5AAF-11B2-80DC-
002032359C64</businessDetailURL>
            </result>
            <result>
                <serviceName>BarnesAndNoble</
serviceName>
<serviceDetailURL>https://uddi.hp.com/ubr/findservice?action=details&
servicekey=D2A1C760-8AD2-15E2-AD9C-
009021419C62</serviceDetailURL>
                <description>Price list for new and
used books</description>
                <business>Barnes and
Nobles</business>
<businessDetailURL>https://uddi.hp.com/ubr/findbusiness?action=details
&businesskey=BCA368A0-4BAF-11D2-50DC-
002039379D61</businessDetailURL>
            </result>
            1
        </KeywordSearchResult>
    </namesp1:KeywordSearchResult>
  </SOAP-ENV:Body>
</SOAP-ENV:Envelope>
```

Figure 4:
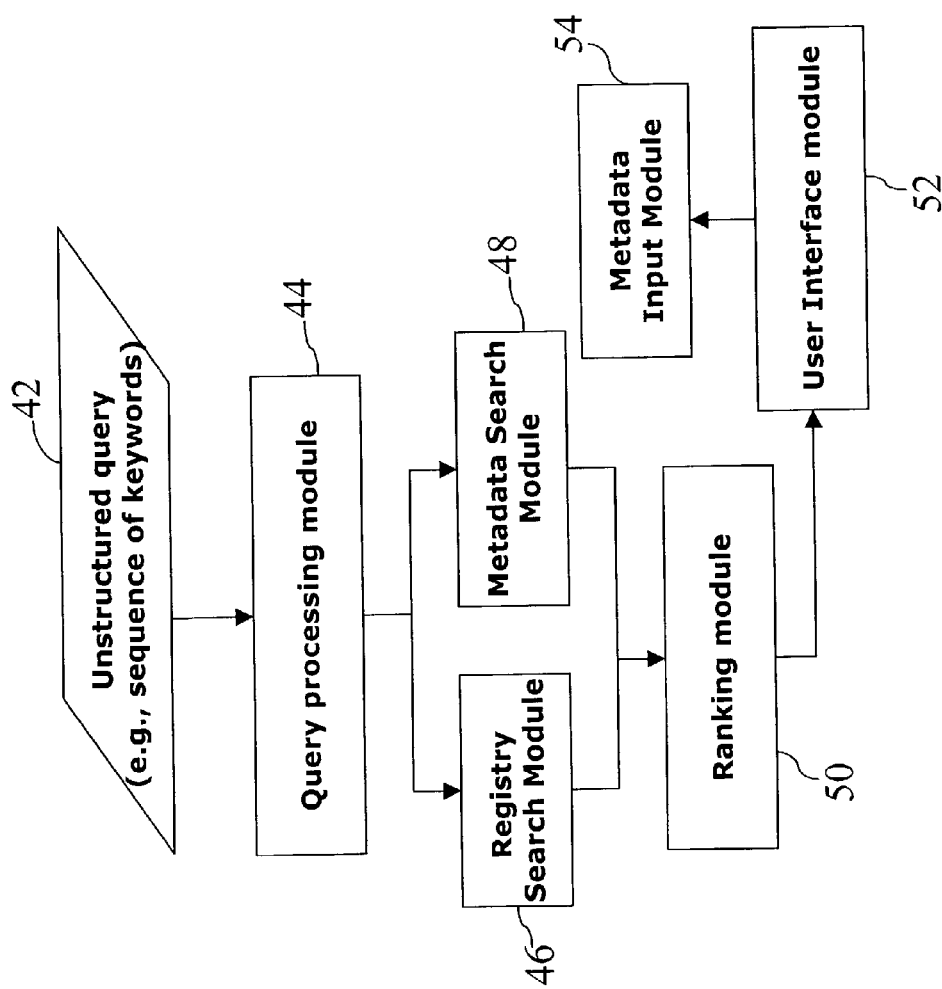
FIG. 4 is a flow diagram of a mechanism for processing unstructured queries in accordance with one embodiment of the present invention.

FIG. 4 schematically illustrates in accordance with another preferred embodiment of the present invention, a mechanism for processing an unstructured query 42 from registry client 40 (FIG. 3). Specifically, a query processing module 44, which is part of UDDI service registry interface 38 (FIG. 3), is programmed to receive unstructured SOAP queries (such as unstructured query 42) and pull up keywords for input into a registry search module 46 and a metadata search module 48, both modules being part of UDDI service registry interface 38. Registry search module 46 and metadata search module 48 are programmed to process the keywords into calls (e.g., SQL calls) onto the databases of service data registry 34 and metadata registry 36, respectively. Service data registry 34 and metadata registry 36 process the calls and generate a response which contains the information results (from the databases) that matched the keywords. The response is then input to a ranking module 50 which is also part of UDDI service registry interface 38, as generally depicted in FIG. 4.

Ranking module 50 is preferably programmed to identify and measure the authority of the inputted results using known web search engine and data mining techniques. This initial set of inputted results could include any number of documents that include a keyword from the query terms (or, optionally a synonym for a keyword from the query). In addition, there may exist some relationships (links) between the documents in the initial result set, and the documents may themselves contain links to other documents.

The challenge, generally, is to identify the documents that are of high quality (authoritative) given the query terms which somewhat resembles the problem of identifying authoritative web pages. In the case of web pages, search engines can exploit the fact that web pages link to each other which has led to defining a special category of web pages called a hub. A hub is one (web page) or a set of web pages that provides collections of links to authoritative pages. One can leverage algorithms such as HITS (Hyperlink-Induced Topic Search) to use hub pages to find authoritative pages.

In regard to service registries, the population of a UDDI or non-UDDI service registry is obviously smaller than that of the worldwide web (WWW) and the WWW is unlikely to have a significant number of links that point directly to entries in a service registry. However, the records in UDDI service data registry 34 (which contains structured information with known semantics) may contain links to other records or to web pages, which may themselves be authoritative web pages. UDDI metadata registry 36 may include usage logs, such as transaction records indicating query terms submitted by users and the documents that were selected, as well as information about the users. Metadata registry 36 may also include pre-calculated (e.g., using the HITS algorithm) authority measures for the pages linked to by registry records.

For example, in order to quantify the relevance of the results to the querying user, the following characteristics (from indices stored in metadata registry 36) may be taken into account:

I. the number of occurrences of a search term in each matching document in comparison with the number of occurrences in other potential matching documents;

II. the number of matching documents associated with each registry entry, as well as the "distance" (level of removal) of these documents from the source document; and III. the context of the search terms in the matching document, e.g., does the search term appear in a "header", or is it in the tModel description element, etc.

In addition, statistics as to the queries and selections (clicks) of the users may be obtained in metadata registry 36 with these statistics being leveraged during the raking process.

Figure 7:
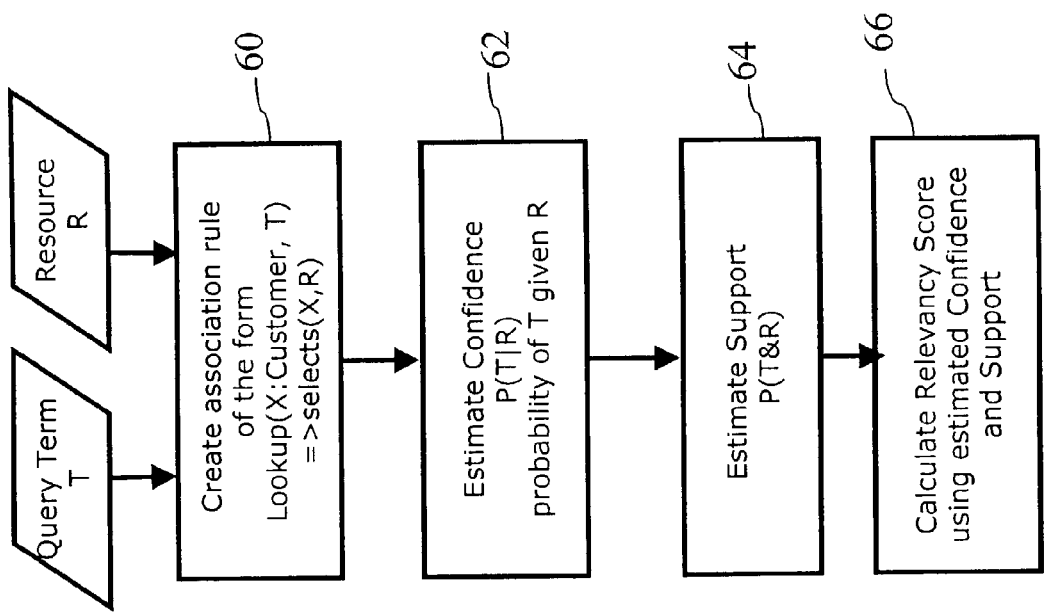
FIG. 7 is a flow diagram of a method for calculating a relevancy score in accordance with one embodiment of the present invention.

In one example graphically illustrated in FIG. 7, ranking module 50 may be programmed to calculate a relevancy score for identified resources using search results from metadata registry 36 by estimating confidence and support values using an association rule of the form:

Lookup(X:customer, T: query term)=>selects(X, R:resource)

In general, a resource is anything addressable by a name. The name could reference a file or a service, such as a file system. Some examples include a web page (URL), network time service (IP address), file (inode number), memory location (address). The relevancy score calculation process graphically depicted in FIG. 7 is essentially a data mining technique comprising steps 60-66, inclusive, as follows.

Step 60 deals with creating an association rule that indicates the correlation 's submitting query term T and selecting resource R. In one example, the may be of the form:

Lookup(X:customer, T)=>Selects (X, R).

Step 62 deals with estimating the confidence or probability of how likely it is that a query term T will occur when a resource R has occurred, defined by P(T|R). Probability P(T|R) may be estimated by counting the number of occurrences of query term T associated with resource R and then dividing that number by the total number of occurrences of resource R. Confidence is an objective measure of how valid an association rule can be. For example, given a set of transactions in a transaction database, the confidence of A=>B may be defined as confidence (A=>B)=#tuples_containing_both_A_and_B/#_tuples_containing_A.

Step 64 deals with estimating support or the probability of how often a query term T and a resource R can occur together as a fraction of all resources, defined by P(T&R). Probability P(T&R) may be estimated by counting the number of occurrences of query term associated with resource R and then dividing that number by the total number of resources in the dataset. Support, in general, is an objective measure of the potential usefulness of a pattern. Support of an association pattern refers to the fraction of task-relevant data #_tuples or transactions) for which the pattern is true. For association rules of the form A=>B, where A and B are item sets, it may be defined as support(A=>B)=tuples_containing both_A_and_B/total_#_of tuples.

Further details on confidence and support may be found, for example, in J. Han and M. Kamber's "Data Mining: Concepts and Techniques", Morgan Kaufmann Publishers, 2001.

A person skilled in the art should recognize that the above-described process steps do not have to be performed in the order shown in FIG. 7, but may be performed in any order.

Step 66 deals with calculating a relevancy score (RS) using the estimated confidence and support values. One way to calculate RS is to define it as a combination of the confidence and support of the association rules linking the queried terms to the resources in the result set. In one example, RS may be calculated by simply adding together the estimated confidence and support values of association rules that meet certain pre-defined minimum thresholds, and using that number to indicate the relevancy of identified resources. That is, given some arbitrary minimal thresholds (e.g., minimum_confidence and minimum_support), one could postulate that if ((confidence>minimum_confidence) ^ (support>minimum_support)), then, RS=confidence+support, otherwise, RS=0, where "^" stands for "AND". Further details on relevancy score methods of calculation may be found, for example, in J. Han and M. Kamber's "Data Mining: Concepts and Techniques", Morgan Kaufmann Publishers, 2001.

Once relevancy scores reflecting the relevancy of resource R for all terms in a query have been computed, a complete relevancy score may be computed for resource R. For example, the complete relevancy score may be estimated by taking into consideration the resource's relevancy scores with regards to each of the query terms, e.g., a resource that was highly relevant to all of the query terms would be ranked higher than a resource that was highly relevant to only some of the query terms.

Ranking module 50 may utilize other known data mining techniques, such as clustering, to determine relevancy, apply existing taxonomies, map the query terms into categories, and then calculate the relationship between a resource and these categories. In one embodiment, the following association rule may be used: Lookup(x:customer, term1) ^ contains(documentA, term1) ^ type(documentA, typeA)=>selects(X, documentA), where "^" stands for "AND". Other ranking techniques may be employed, provided such other ranking techniques do not depart from the intended purpose of the present invention.

Each of the potential matches represents an entry from a web resource database, presumably accessed via XML queries. A user interface module 52 (FIG. 4), also part of UDDI service registry interface 38, is preferably programmed to return the ranked results to registry client 40 (FIG. 3) by automatically generating and presenting an XML query for retrieving the primary (e.g., businessEntity) registry entry, as well as an XML query (or queries) that retrieves the most relevant sub-entry (e.g., businessService) for the initial query. User interface module 52 is also preferably programmed to provide feedback to a metadata input module 54 which is part of UDDI service registry interface 38 and is operatively coupled to metadata registry 36 (FIG. 3). Metadata input module 54 is preferably used to generate and subsequently update metadata registry 36 (FIG. 3), as generally illustrated in FIG. 5.

Figure 5:
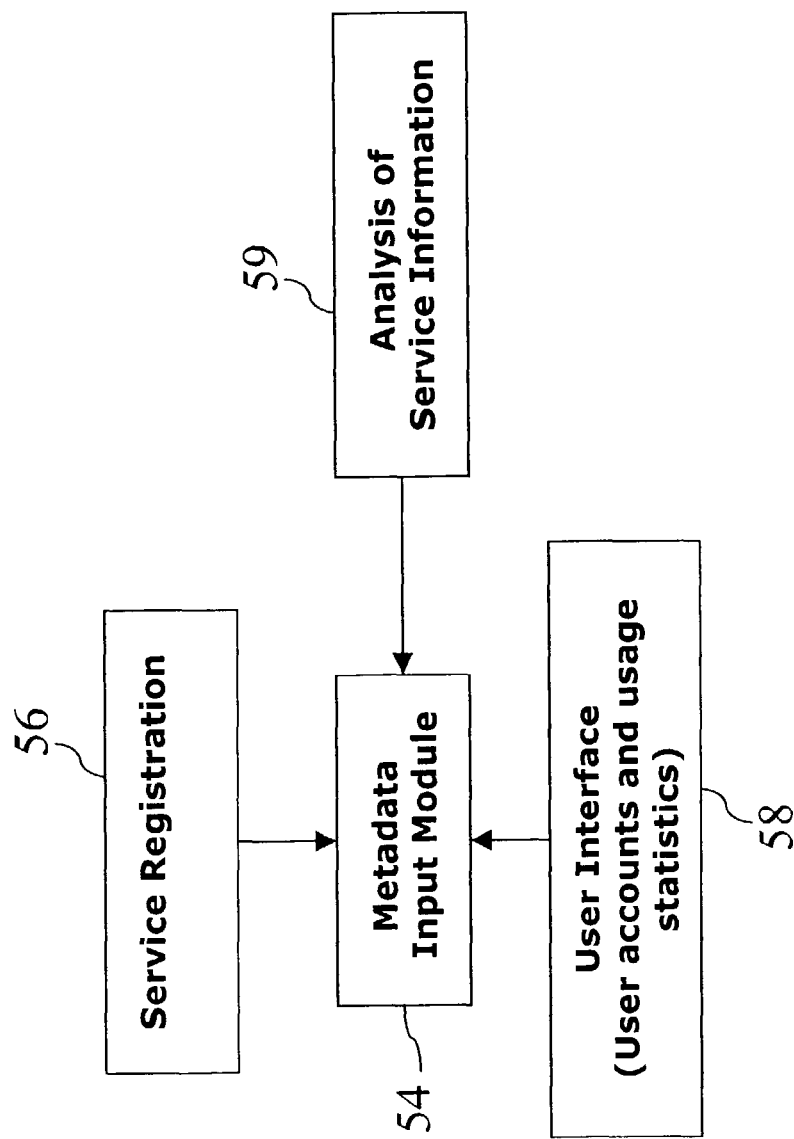
FIG. 5 is a flow diagram of a metadata generation and update process in accordance with one embodiment of the present invention.

In general, metadata input module 54 may be programmed to receive metadata from a number of sources, such as during service registration 56 (FIG. 5). For example, at the time a company registers with the UDDI service registry, the company may be required to input additional information (metadata), such as a brief description of services, potential clients' description, hours of operation, etc. even though this information is not currently part of the UDDI data model. In this regard, additional information is generally defined as data being in addition to the registry-specific data that is required during registration.

Alternatively, metadata input module 54 may be programmed to receive metadata via an user interface 58 (FIG. 5) which may contain user account and usage statistics. User account and usage statistics may be generated using known web search engine and data mining techniques. In general, web search engines distinguish themselves by unique ranking algorithms which are used to measure the degree to which a given resource answers a query (e.g., the authority of a given web page). Most web search engines rely on the existence of user information to measure the authority of a given web page by analyzing web pages containing links to a given web page, or terms occurring within the content of the web page, or web page links contained by the web page.

Another well-known use for user account and usage statistics is the so-called item association mining in transaction databases (also called "shopping basket analysis") in which, for example, statistics about the items in retail customers' shopping baskets are correlated so as to predict the relevancy of a given item to a specific customer given information about the customer (e.g., their user profile) or other items in the customer's basket.

Metadata input module 54 may be also programmed to receive metadata by way of analysis of service information 59 (FIG. 5) which may be accomplished using known data mining techniques. For example, analysis may be performed on the textual descriptions contained in service data registry 34 (FIG. 3) to generate indices that estimate the degree to which given terms correspond to specific resources. In this regard, metadata input module 54 would preferably be programmed to rebuild the index structures regularly, as well as maintain user profiles and log data about the usage of UDDI service registry 32. A person skilled in the art would immediately recognize that utilizing user profile and log data usage information would make it possible to provide collaborative filtering of potential search results.

In regard to UDDI service registry 32, utilizing the above-described novel mechanism for searching service registries frees users from having to understand or use the underlying UDDI registry data structures and data conventions. Also, users can exploit UDDI metadata registry 36 to use collaborative filtering and other data mining techniques to improve the ordering of multiple search results. Furthermore, registry client 40 may send unstructured and/or structured queries to UDDI service registry interface 38.

Other components and/or configurations may be utilized in the above-described embodiments, provided that such components and/or configurations do not depart from the intended purpose and scope of the present invention.

While the present invention has been described in detail with regards to one or more preferred embodiments, it should also be appreciated that various modifications and variations may be made in the present invention without departing from the scope or spirit of the invention. In this regard it is important to note that practicing the invention is not limited to the applications described hereinabove. Many other applications and/or alterations will be apparent to those skilled in the art.

It should be appreciated by a person skilled in the art that features illustrated or described as part of one embodiment may also be used in other embodiments. It is, therefore, intended that the present invention cover all such modifications, embodiments and variations as long as they come within the scope of the appended claims and their equivalents.

What is claimed is:

1. A network service system comprising a service registry interacting with a registry client, said service registry including a service registry interface operatively coupled to (i) a service data registry for processing structured queries from said registry client regarding registered services and (ii) a metadata registry for processing unstructured queries from said registry client regarding said registered services,
wherein said structured queries permit retrieval of specific information regarding said registered services by designating specific data structures internal to the service data registry,
wherein said structured queries permit said registry client to determine at least one of security protocols and transport protocols supported by a given registered service, and
wherein the service registry interface is configured to receive an input unstructured query and then, based on the input unstructured query, at least one of: (1) process a call into the metadata registry, in which case the metadata registry includes an index on service descriptions within the service data registry, or (2) process calls into both the service data registry and the metadata registry.

2. The network service system of claim 1, further comprising a mechanism for processing unstructured queries wherein said mechanism for processing unstructured queries comprises a query processing module adapted to receive unstructured queries and pull up keywords for input into a registry search module and a metadata search module, said registry search module and said metadata search module being adapted to process said keywords into calls onto said service data registry and said metadata registry respectively.

3. The network service system of claim 2, wherein said mechanism for processing unstructured queries further comprises a ranking module coupled to said registry search module and said metadata search module and adapted to receive and measure the authority of information results matching said keywords from said service data registry and said metadata registry.

4. The network service system of claim 3, wherein said mechanism for processing unstructured queries further comprises a user interface module coupled to said ranking module and adapted to receive and present said ranked results to a user.

5. The network service system of claim 4, wherein said mechanism for processing unstructured queries further comprises a metadata input module operatively coupled between said user interface module and said metadata registry and adapted to receive feedback on said ranked results from said user interface module to update said metadata registry.

6. The network service system of claim 5, wherein said metadata input module is further adapted to receive metadata by way of service registration to generate said metadata registry.

7. The network service system of claim 5, wherein said metadata input module is further adapted to receive metadata by way of analysis of service information to generate said metadata registry.

8. The network service system of claim 5, wherein said metadata input module is further adapted to receive metadata by way of service registration to update said metadata registry.

9. The network service system of claim 5, wherein said metadata input module is further adapted to receive metadata by way of analysis of service information to update said metadata registry.

10. The network service system of claim 5, wherein said metadata input module is further adapted to receive metadata by way of an user interface to update said metadata registry, said received metadata including user accounts and usage statistics.

11. The network service system of claim 5, wherein said metadata input module is further adapted to receive metadata by way of an user interface to generate said metadata registry, said received metadata including user accounts and usage statistics.

12. The network service system of claim 3, wherein said ranking module is adapted to calculate a relevancy score for identified resources using information results from said metadata registry.

13. The network service system of claim 12, wherein said ranking module is adapted to calculate said relevancy score using estimated confidence and support values.

14. The network service system of claim 1, wherein said service registry comprises a Universal Description Discovery and Integration (UDDI) service registry.

15. The network service system of claim 14, wherein searching of said service data registry requires said registry client to specify which UDDI data structures are being searched.

16. The network service system of claim 1, wherein the service registry interface is accessible over an Internet.

17. The network service system of claim 1, wherein said service data registry and said metadata registry provide different organizations of data regarding the registered services.

18. The network service system of claim 1, wherein searching of the service data registry requires traversal of internal data structures of the service data registry.

19. The network service system of claim 1, wherein the service registry interface is further configured to rank returned results from the calls into the service data registry and the metadata registry.

20. The network service system of claim 1, wherein search results returned by the service registry interface in response to the input unstructured query include at least one of a record or a webpage obtained by following a link in a matching record in the service data registry.

21. A system comprising a service registry interface operatively coupled to (i) a service data registry for processing structured queries regarding registered services and (ii) a metadata registry for processing unstructured queries from a registry client regarding said registered services,
wherein said structured queries permit retrieval of specific information regarding said registered services by designating specific data structures internal to the service data registry,
wherein said structured queries permit determination of at least one of security protocols and transport protocols supported by a given registered service, and
wherein the service registry interface is configured to receive an input unstructured query and then, based on the input unstructured query, at least one of: (1) process a call into the metadata registry, in which case the metadata registry including an index on service descriptions within the service data registry, or (2) process calls into both the service data registry and the metadata registry.

22. The system of claim 21, wherein said service registry interface comprises a query processing module adapted to receive unstructured queries and pull up keywords for input into a registry search module and a metadata search module, said registry search module and said metadata search module being adapted to process said keywords into calls onto said service data registry and said metadata registry respectively.

23. The system of claim 22, wherein said service registry interface further comprises a ranking module coupled to said registry search module and said metadata search module and adapted to receive and measure the authority of information results matching said keywords from said service data registry and said metadata registry.

24. The system of claim 23, wherein said service registry interface further comprises a user interface module coupled to said ranking module and adapted to receive and present said ranked results to a user.

25. The system of claim 21, wherein said service registry interface further comprises a metadata input module operatively coupled between said user interface module and said metadata registry and adapted to receive feedback on said ranked results from said user interface module to update said metadata registry.

26. The system of claim 25, wherein said metadata input module is further adapted to receive metadata by way of service registration to generate said metadata registry.

27. The system of claim 25, wherein said metadata input module is further adapted to receive metadata by way of analysis of service information to generate said metadata registry.

28. The system of claim 25, wherein said metadata input module is further adapted to receive metadata by way of an user interface to generate said metadata registry, said received metadata including user accounts and usage statistics.

29. The system of claim 25, wherein said metadata input module is further adapted to receive metadata by way of service registration to update said metadata registry.

30. The system of claim 25, wherein said metadata input module is further adapted to receive metadata by way of analysis of service information to update said metadata registry.

31. The system of claim 25, wherein said metadata input module is further adapted to receive metadata by way of an user interface to update said metadata registry, said received metadata including user accounts and usage statistics.

32. The system of claim 23, wherein said ranking module is adapted to calculate a relevancy score for identified resources using information results from said metadata registry.

33. The system of claim 32, wherein said ranking module is adapted to calculate said relevancy score using estimated confidence and support values.

34. The system of claim 21, wherein said service registry comprises a Universal Description Discovery and Integration (UDDI) service registry.

35. The system of claim 34, wherein said structured queries require said registry client to specify which UDDI data structures are being searched.

36. The system of claim 34, wherein searching of said service data registry requires said registry client to specify which UDDI data structures are being searched.

37. The system of claim 21, wherein the service registry interface is accessible over an Internet.

38. The system of claim 21, wherein said service data registry and said metadata registry provide different organizations of data regarding the registered services.

39. The system of claim 21, further comprising a plurality of registry clients in communication with said service registry interface.

40. The system of claim 21, wherein searching of the service data registry requires traversal of internal data structures of the service data registry.

41. The system of claim 21, wherein the service registry interface is further configured to rank returned results from the calls into the service data registry and the metadata registry.

42. The system of claim 21, wherein search results returned by the service registry interface in response to the input unstructured query include at least one of a record or a webpage obtained by following a link in a matching record in the service data registry.

43. A system for providing and retrieving service data, comprising:
a service registry storing structured data regarding registered services; and
a plurality of registry clients communicating with said service registry across a network,
wherein said service registry responds to structured queries and unstructured queries regarding said registered services by providing information requested in said structured queries and unstructured queries,
wherein said structured queries permit retrieval of specific information regarding said registered services by designating specific data structures internal to the service registry,
wherein said structured queries permit said registry clients to determine at least one of security protocols and transport protocols supported by a given registered service, and
wherein said service registry receives an input unstructured query and then, based on the input unstructured query, searches service descriptions that are used in responding to the structured queries.

44. The system of claim 43, wherein the service registry is accessible over an Internet.

45. The system of claim 43, wherein said service registry also stores unstructured metadata regarding said registered services.

46. and The system of claim 43, wherein said structured queries require traversal of internal data structures of the service registry.

47. The system of claim 43, wherein said service registry comprises a Universal Description Discovery and Integration (UDDI) service registry.

48. The system of claim 43, wherein search results returned by the service registry in response to the input unstructured query include at least one of a record or a webpage obtained by following a link in a matching record in the service descriptions.

* * * * *

UNITED STATES PATENT AND TRADEMARK OFFICE
CERTIFICATE OF CORRECTION

PATENT NO. : 8,495,211 B2
APPLICATION NO. : 10/255818
DATED : July 23, 2013
INVENTOR(S) : Harumi Anne Kuno et al.

It is certified that error appears in the above-identified patent and that said Letters Patent is hereby corrected as shown below:

In the Claims:

In column 15, line 11, in Claim 25, delete "21," and insert -- 24, --, therefor.

In column 16, line 45, in Claim 46, delete "and The" and insert -- The --, therefor.

Signed and Sealed this
Twenty-second Day of October, 2013

Teresa Stanek Rea
*Deputy Director of the United States Patent and Trademark Office*